Figure 1:
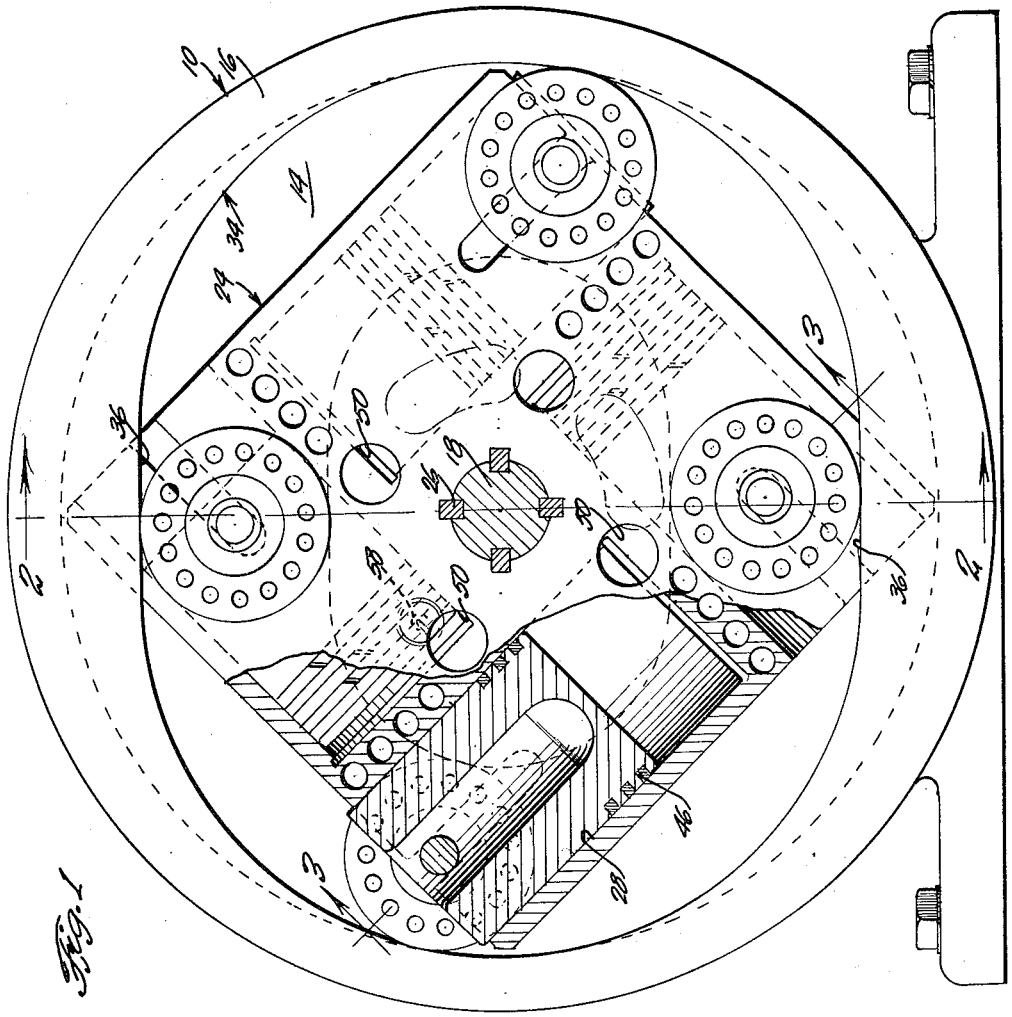

Dec. 15, 1964  H. A. LEATH  3,161,183
ROTARY INTERNAL COMBUSTION ENGINE
Filed July 17, 1962  3 Sheets-Sheet 1

INVENTOR.
HARRY A. LEATH
BY
Victor J. Evans & Co.
Attorneys

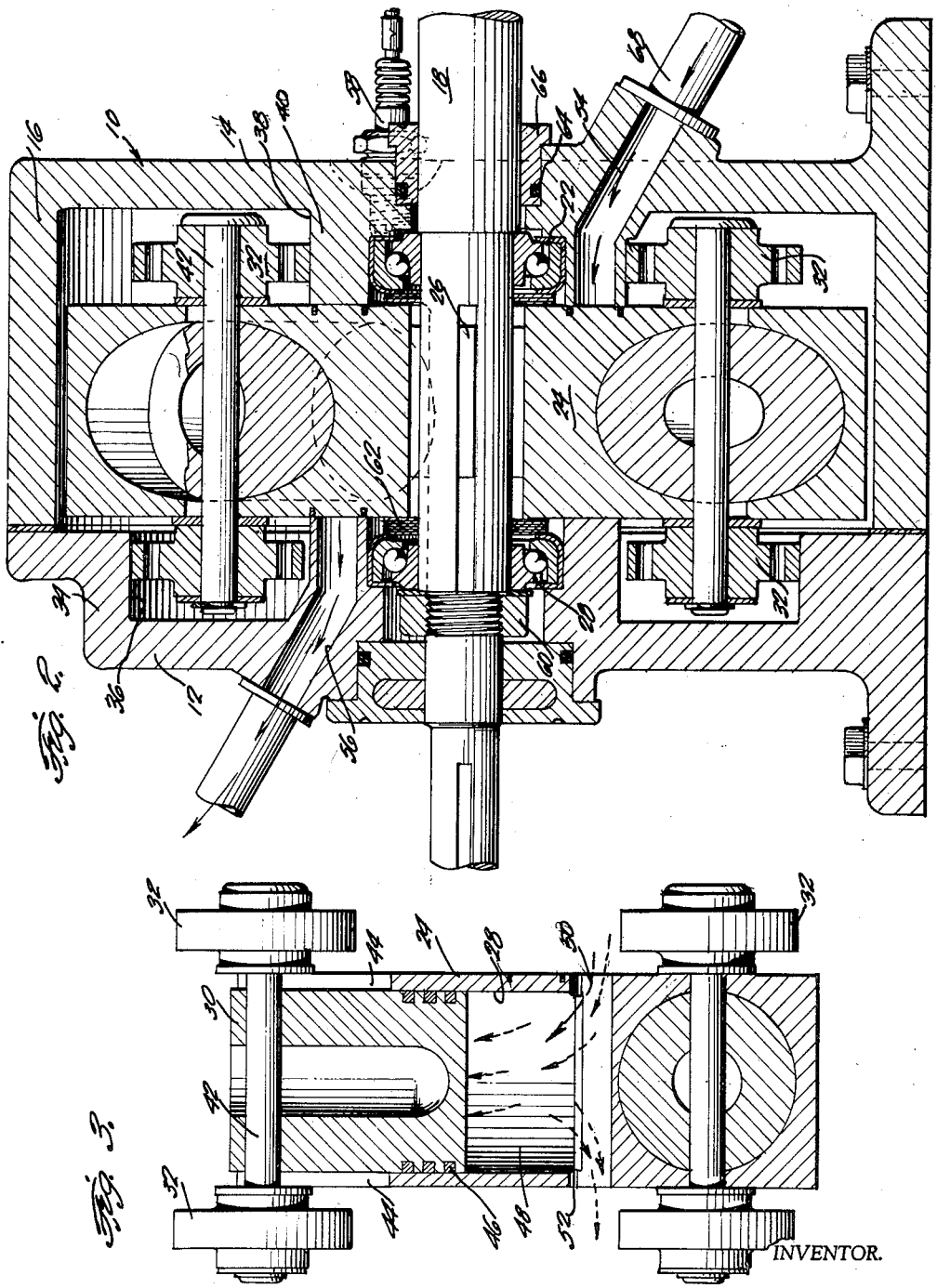

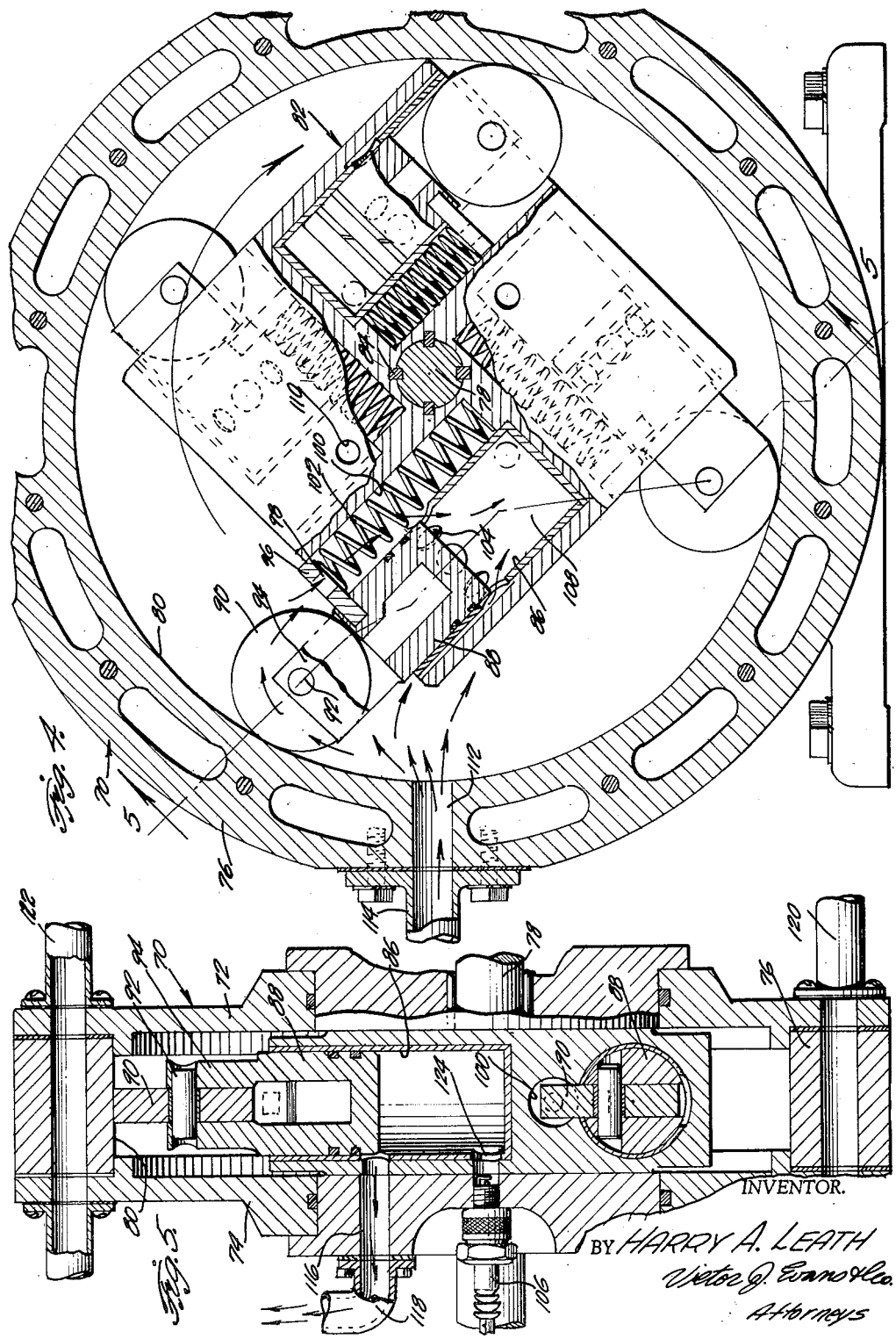

United States Patent Office 3,161,183
Patented Dec. 15, 1964

3,161,183
ROTARY INTERNAL COMBUSTION ENGINE
Harry A. Leath, 21932 Standing Rock Road,
Apple Valley, Calif.
Filed July 17, 1962, Ser. No. 210,435
4 Claims. (Cl. 123—43)

The present invention relates to rotary internal combustion engines generally and in particular to a rotary internal combustion engine which may be manufactured as a two cycle or as a four cycle engine.

An object of the present invention is to provide a rotary internal combustion engine having a minimum number of parts, one which is positive in operation, one which may be constructed either as a two cycle or as a four cycle engine, and one which is economically feasible.

Another object of the present invention is to provide a rotary internal combustion engine in which there is a rotor having a piston slidable therein, the piston providing the force to turn the rotor of the engine.

A further object of the present invention is to provide a rotary internal combustion engine which may be manufactured in any size desired, one which may be produced on conventional metal working machines, and one which has a relatively high power output ratio with respect to the weight of the engine.

These and other objects and advantages of the present invention will be fully apparent from the following description when taken in connection with the annexed drawings, in which:

FIGURE 1 is a view in elevation of the engine according to the present invention with one end wall removed and with parts of the rotor shown broken away, FIGURE 2 is a view taken on the line 2—2 of FIGURE 1, FIGURE 3 is a view taken on the line 3—3 of FIGURE 1, FIGURE 4 is a view similar to FIGURE 1 but showing a modified form of the invention, and FIGURE 5 is a view taken on the line 5—5 of FIGURE 4.

With reference to FIGURES 1 to 3, inclusive, the engine of the present invention is designated generally by the reference numeral 10 and it comprises end walls 12 and 14 connected together by a continuous side wall 16.

A shaft 18 is rotatably journaled in the end walls 12 and 14 in bearing assemblies 20 and 22. A rotor 24 is secured by teeth 26 to the shaft 18.

The rotor 24 is square in cross sectional configuration and each face of the rotor 24 is provided with a tangentially arranged bore 28 in which there is a piston 30 slidable from one end of the bore to the other. Each bore 28 extends in from the perimeter of the rotor 24 and terminates at a point spaced from the perimeter of the rotor 24.

A roller 32 is carried on the end of the piston 30 exteriorly of the bore 28 and is rollably engaged upon the inner surface of a shoulder 34 provided in the casing end wall 12, the inner surface of the shoulder 34 constituting a trackway 36. Another roller 32 on the other side of each piston 30 is carried by the piston 30 and is rollably engaged upon another trackway 38 provided on a hub portion 40 of the end wall 14.

The rollers 32 of each piston 30 are mounted upon an axle 42 which extends through the piston 30 and is slidable in slots 44 in each side of the rotor 24, as shown in FIGURE 3.

Each piston 30 has piston rings 46 on the one end which is adjacent the shaft 18 and the space between the bottom of the bore 28 and the piston end constitutes a combustion chamber 48.

The chamber 48 is provided on one side with an inlet port 50 and on the other side with an outlet port 52. The casing end wall 14 is provided with an inlet 54 for the admission of a fuel-air mixture into the combustion chamber 48. The casing end wall 12 is provided with an outlet 56 by means of which the combustion products are conducted to a place of disposal or to the free atmosphere.

Ignition means is provided for exploding the charge of air and fuel in each of the combustion chambers 48 in turn. This ignition means consists in a spark plug 58 threadably engaged in a bore provided in the end wall 14 and connected in communication with each of the combustion chambers 48 in turn.

As shown in dotted lines in FIGURE 1, the spark plug 58 is registrable with the port 50 upon rotation of the rotor 24 in the direction indicated by the arrow.

Exteriorly of the bearing assembly 20 is a nut 60 threadably engaged with threads on the shaft 18 and used to tighten the bearing assembly 20 against packing elements 62 circumposed about the shaft and bearing against the adjacent part of the rotor 24.

Suitable seals and gland elements, as at 64 and 66 respectively, seal the other end portion of the shaft 18 to the end wall 14.

In operation, a fuel-air mixture is introduced through a conduit 68 into the inlet 54 and as the rotor 24 rotates it is drawn through the port 50 into the combustion chamber where it is compressed and ignited by the spark plug 58. Following ignition of the charge in the combustion chamber 48 the piston is driven so that the rollers 32 engage the trackways 36 and 38 and impart rolling movement to themselves as they effect the power stroke and transmit this power to the rotation of the shaft 18. The compression and power strokes are executed during engagement of the rollers with the trackways in the upper portion of the mechanism and the exhaust and intake strokes follow during the next half revolution of the rotor.

As the rollers approach the raised trackway in the lower portion of the mechanism, the piston is moved inwardly effecting exhaust of the gases through port 52 and outlet 56. When the piston reaches its innermost position, the rotor has rotated to a position of having the outlet and inlet ports disposed between the inlet 54 and the outlet 56. This position is illustrated in FIGURE 1 by the inlet port shown at the extreme right side in the drawing and the inlet and outlet shown in phantom lines adjacent thereto and on opposite sides thereof. When the piston moves outwardly again during rotation of the rotor, the inlet port is disposed in communication with the inlet 54.

Referring to FIGURES 4 and 5 a second form of the invention is shown in which a casing 70 has end walls 72 and 74 and a side wall 76 connecting the perimeters of the end walls together. In this form of the invention there is a shaft 78 mounted eccentrically with respect to the circular trackway provided on the inner surface of the side wall 76, such trackway being designated by the numeral 80.

A square rotor 82 is fixed to the shaft 78 by keys 84. The rotor 82 is provided with a plurality of bores 86 each arranged tangentially with respect to the shaft 78. In each bore 86 is a piston 88 and the end of the piston outside of the rotor 82 carries a roller 90 in rolling engagement with the trackway 80.

Each roller 90 is secured to the adjacent piston 88 by means of an axle 92 extending through the bifurcated end portion 94 of the piston 88.

Each piston 88 carries a lug 96 having an aperture 98 therethrough for the admission of fuel-air mixtures which travel through the aperture 98 and into a bore 100 provided in the piston 88.

A spring 102 has one end seated upon the end of the bore 100 and the other end bearing against the inner face of the lug 96. The spring 102 biases the lug 96 outwardly so that the roller 90 is forced into rolling engagement with the trackway 80.

Inlet ports or openings 104 are formed in the wall of the chamber in which the piston 88 slides and the air-fuel mixture enters the chamber through such openings 104.

A spark plug 106 carried by the casing end wall 74 is connected in communication with the combustion chamber, as at 108, by means of an opening 110 in the rotor adjacent each of the pistons 88.

The casing side walls 76 is provided with a port 112 for admitting a fuel-air mixture into the interior of the casing 70. The port 112 is connected in communication with a conduit 114 leading to a carburetor which is not shown here as not being a part of the present invention.

Combustion products or exhaust gases are exhausted through the openings 104 and into a port 116 provided in the end wall 74. Conduit 118 is connected in communication with the port 116 and leads to a place for disposal of the combustion products.

The form of the invention shown in FIGURES 4 and 5 is water cooled with an inlet pipe 120 leading to the water jacket formed in the casing side wall 76. An outlet pipe 122 is connected to the water jacket of the casing side wall and leads to a place for cooling the water when circulated through the water jacket.

In operation, the invention shown in FIGURES 4 and 5 operates on a two cycle basis with the fuel-air mixture entering each combustion chamber 108 in turn and being exploded by the spark from the spark plug 106. The air-fuel mixture enters the combustion chambers through aperture 98, bore 100, and opening 104 which is in commuication with bore 100. When the rotor continues to rotate, the fuel-air mixture is compressed in each chamber 108 during the downward stroke of the piston therein. As the rotor is forced to rotate due to the eccentric position of the shaft 178, the spark plug is brought into registry with the opening 124 provided in the chamber 108 and ignites the fuel-air mixture to propel the piston outwardly of the combustion chamber. The piston moves outwardly and the exhaust gases are exhausted through the openings 104 which are in communication with the port 116 and when the rotor aligns the opening 104 with the port 116, the exhaust gases are ported into the port 116 as the rotor rotates further.

It will be seen therefore that the engine, in each of the embodiments heretofore described, may be manufactured either as a two cycle engine or a four cycle engine and that numerous modifications and changes may be made in the engine without departing from the spirit of the invention as set forth in the appended claims.

What is claimed is:

1. A rotary internal combustion engine comprising a casing having a pair of spaced end walls and a continuous side wall connecting the perimeters of said end walls together, a rotatable shaft journaled in said end walls, a rotor mounted on said shaft for rotation therewith, said rotor being provided with at least one bore extending inwardly from the perimeter of said rotor and terminating at a point spaced inwardly of said rotor perimeter, said bore being disposed tangentially with respect to said shaft, a piston slidably mounted in said bore, a continuous trackway extending about the interior of said casing, a roller carried on one end of said piston in rolling engagement with said trackways, a second bore disposed in communication with a respective first mentioned bore, a lug connected to said piston and disposed in said second bore, spring means provided in said second bore operatively connected to said lug for biasing said roller toward said trackway, there being an inlet in said casing for the admission of a fuel-air mixture and an outlet in said casing for the exhausting of combustion products, said rotor being provided with a port connecting in turn said inlet and said outlet with the portion of said rotor bore adjacent the other end of said piston, and ignition means in said casing for igniting said fuel-air mixture when admitted to said first bore portion.

2. A rotary internal combustion engine comprising a casing having a pair of spaced end walls and a continuous side wall connecting the perimeters of said end walls together, a rotatable shaft journaled in said end walls, a rotor mounted on said shaft for rotation therewith, said rotor being provided with at least one bore extending inwardly from the perimeter of said rotor and terminating at a point spaced inwardly of said rotor perimeter, said bore being disposed tangentially with respect to said shaft, a piston slidably mounted in said bore, a roller carried on one end of said piston in rolling engagement with the inner face of said side wall, a second bore disposed in communication with a respective first mentioned bore, a lug connected to said piston and disposed in said second bore, spring means provided in said second bore operatively connected to said lug for biasing said roller toward said side wall, there being an inlet in said casing for the admission of a fuel-air mixture and an outlet in said casing for the exhausting of combustion products, said rotor being provided with a port connecting in turn said inlet and said outlet with the portion of said first rotor bore adjacent the other end of said piston, and ignition means in said casing for igniting said fuel-air mixture when admitted to said first bore portion.

3. A rotary internal combustion engine comprising a casing having a pair of spaced end walls and a continuous side wall connecting the perimeters of said end walls together, a rotatable shaft journaled in said end walls, a rotor mounted on said shaft for rotation therewith, said rotor being provided with at least one bore extending inwardly from the perimeter of said rotor and terminating at a point spaced inwardly of said rotor perimeter, said bore being disposed tangentially with respect to said shaft, a piston slidably mounted in said bore, a roller carried on one end of said piston in rolling engagement with the inner face of said side wall, a second bore disposed in communication with a respective first mentioned bore, a lug connected to said piston and disposed in said second bore, spring means provided in said second bore operatively connected to said lug for biasing said roller toward said side wall, there being an inlet in said casing side wall for the admission of a fuel-air mixture and an outlet in said casing side wall for the exhausting of combustion products, said rotor being provided with a port connecting in turn said inlet and said outlet with the portion of said first rotor bore adjacent the other end of said piston, and ignition means in said casing for igniting said fuel-air mixture when admitted to said first bore portion.

4. A rotary internal combustion engine comprising a casing having a pair of spaced end walls and a continuous side wall connecting the perimeters of said end walls together, a rotatable shaft journaled in said end walls, a rotor mounted on said shaft for rotation therewith, said rotor being provided with at least one bore extending inwardly from the perimeter of said rotor and terminating at a point spaced inwardly of said rotor perimeter, said bore being disposed tangentially with respect to said shaft, a piston slidably mounted in said bore, a roller carried on one end of said piston in rolling engagement with the inner face of said side wall, a second bore disposed in communication with a respective first mentioned bore, a lug connected to said piston and disposed in said second bore, spring means provided in said second bore operatively connected to said lug for biasing said roller toward said side wall, there being an inlet in one of said casing end walls for the admission of a fuel-air mixture and an outlet in the other of said casing end walls for the exhausting of combustion products, said rotor being provided with a port connecting in turn said inlet and said outlet with the portion of said first rotor bore adjacent the other end of said piston, and ignition means in said casing for igniting said fuel-air mixture when admitted to said first bore portion.

References Cited in the file of this patent

UNITED STATES PATENTS

| | | |
|---|---|---|
| 1,308,813 | Shuttleworth | July 8, 1919 |
| 1,423,395 | Brown | July 18, 1922 |
| 1,911,265 | Crossley | May 30, 1933 |
| 3,046,950 | Smith | July 31, 1962 |

FOREIGN PATENTS

| | | |
|---|---|---|
| 864,767 | Great Britain | Apr. 6, 1961 |